March 31, 1931. C. SAETTA 1,798,560
SANDWICH MAKING MACHINE
Filed June 1, 1928 5 Sheets-Sheet 2

INVENTOR.
Charles Saetta
BY Hoguet & Neary
ATTORNEYS.

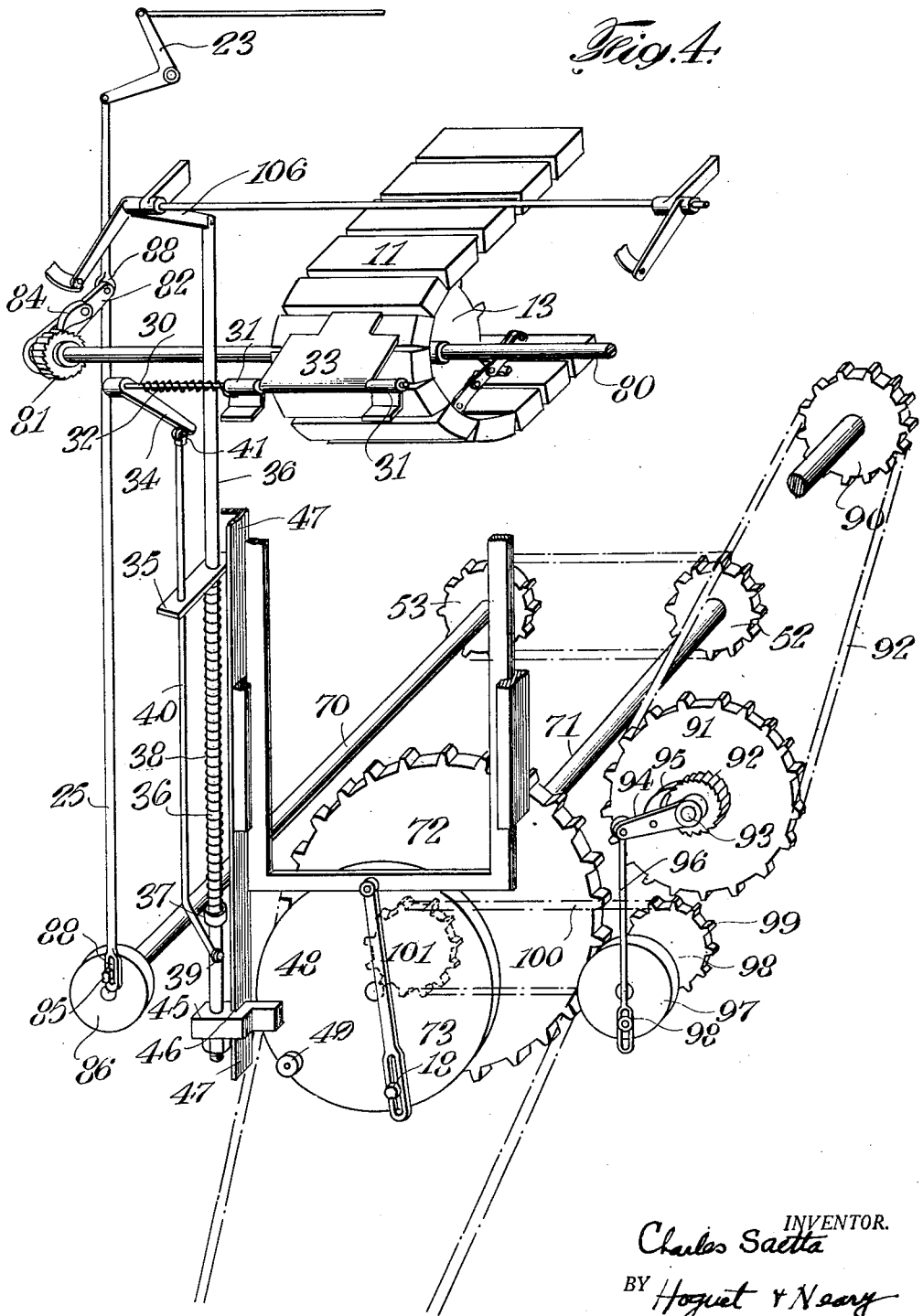

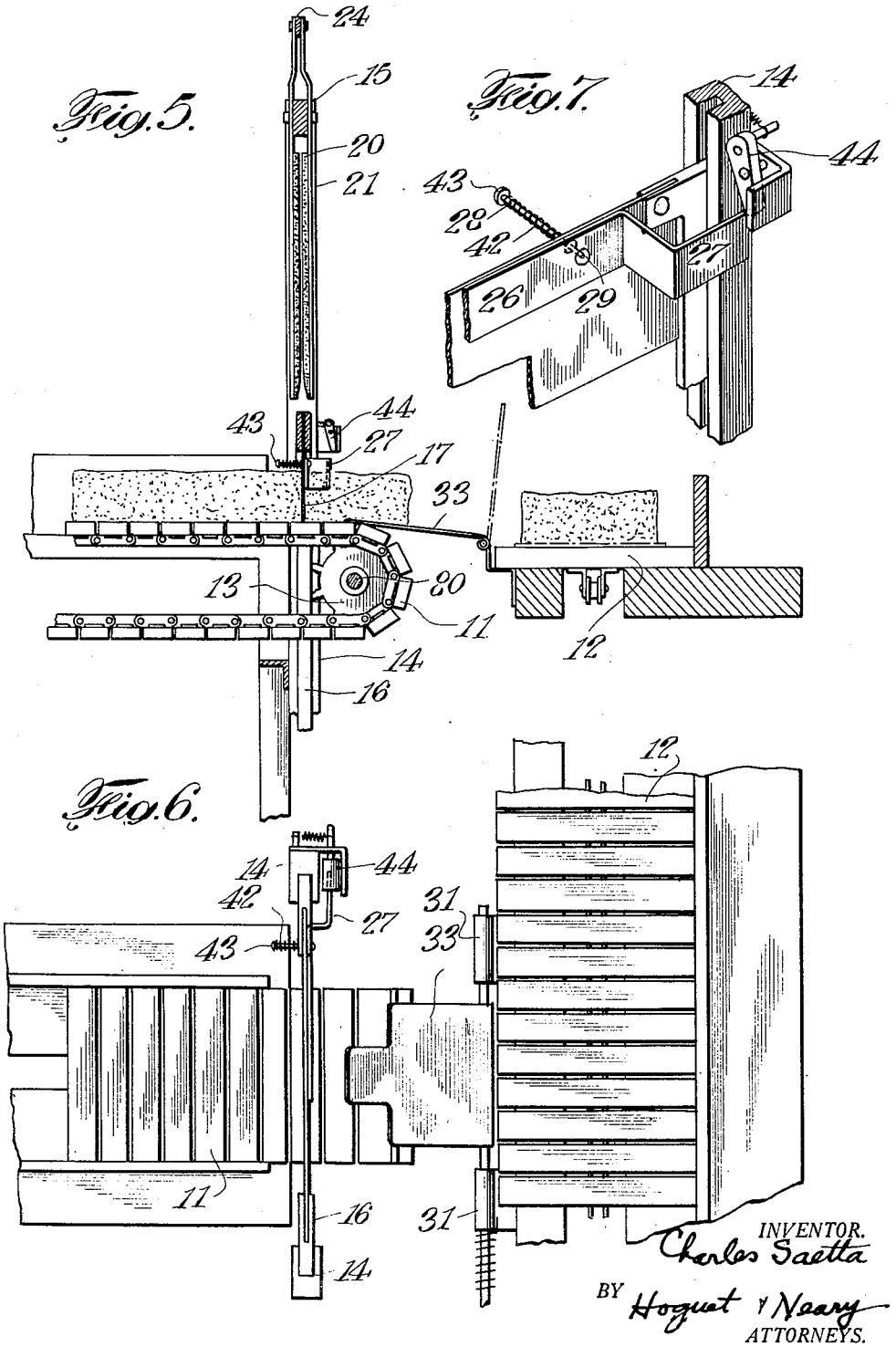

March 31, 1931.  C. SAETTA  1,798,560
SANDWICH MAKING MACHINE
Filed June 1, 1928   5 Sheets-Sheet 5
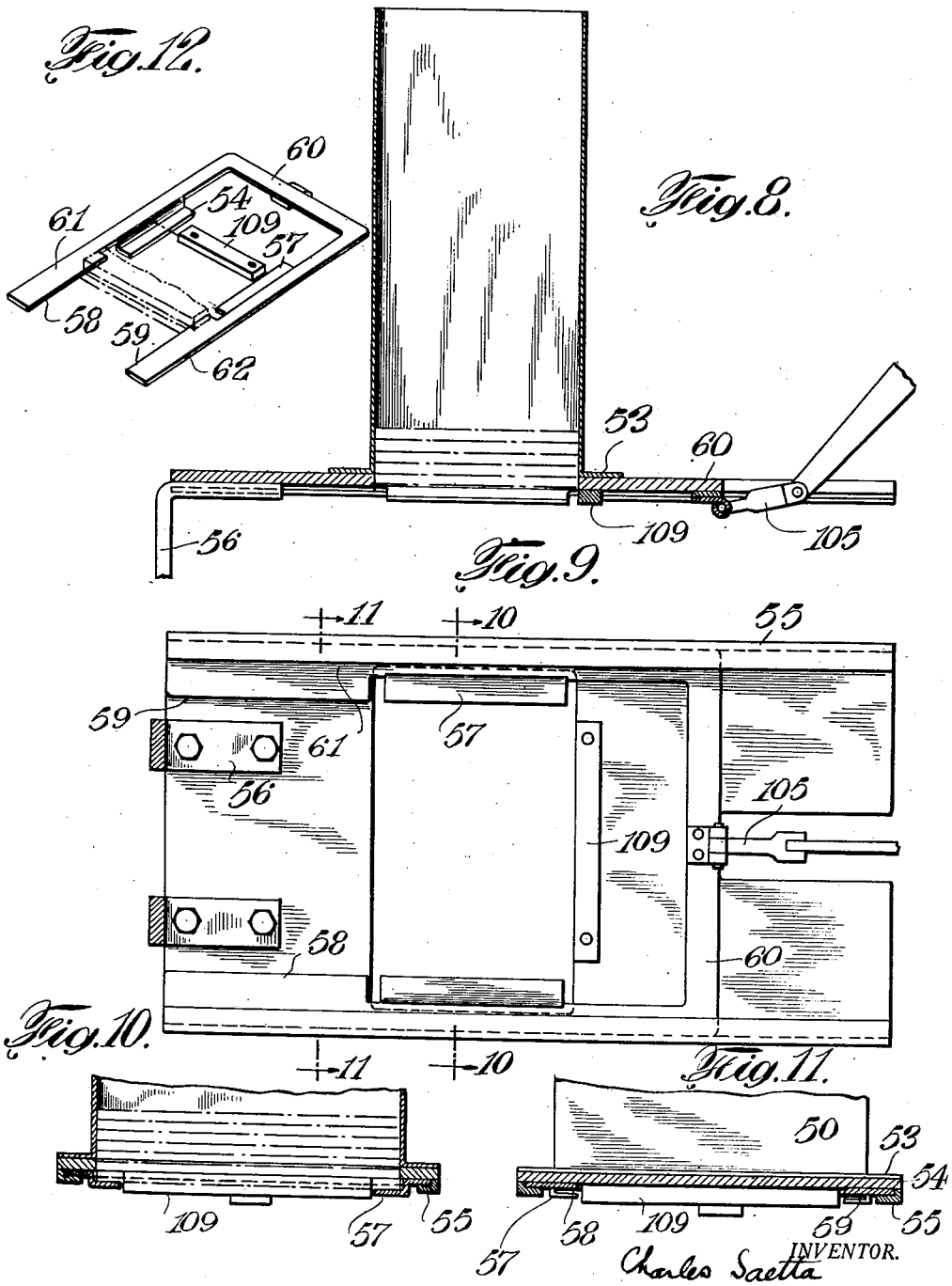

Patented Mar. 31, 1931

1,798,560

UNITED STATES PATENT OFFICE

CHARLES SAETTA, OF BROOKLYN, NEW YORK

SANDWICH-MAKING MACHINE

Application filed June 1, 1928. Serial No. 282,121.

This invention relates to automatic machinery and more particularly to an ice cream sandwich-making machine but, although the principles of this invention are admirably adapted to the efficient making of ice cream sandwiches, it is to be understood that a machine constructed in accordance with my invention may as well be adapted for making sandwiches of any type.

An object of the present invention is to provide a machine that is not only useful in its operation but is attractive in its appearance and may readily be set up in a concession for displaying the method whereby the sandwiches are manufactured and the vendor may sell the sandwiches as they are taken directly from the machine.

A still further object of the invention is to provide a device which will form sandwiches of any desired size, provision being made for varying the amount of filler to be inserted into each sandwich.

The invention contemplates an endless carrier having a pair of wafer containers mounted directly above the same. A second endless carrier is located perpendicular to the first endless carrier and serves to convey the filler, in this particular case ice cream, to the first endless carrier. These endless carriers are designed to move periodically for a purpose to be set forth hereinafter. A means is provided for slicing the filler material and conveying a sliced portion of the same to the first endless carrier and depositing the same above a wafer. As the wafer with the filler material thereon passes beneath the second wafer container, a wafer is deposited on the filler material, thus completing the sandwich. In operation therefore, a number of sandwiches on the endless conveyor in spaced relationship pass to the end of the same where they may be withdrawn for vending purposes.

With these and many other objects in view, which will more readily appear as the nature of the invention is better understood, the same consists in the novel construction, combination and arrangements of parts, which will hereinafter be more fully described, illustrated and claimed.

The essential features of the invention involved in the carrying out of the objects indicated are susceptible to modification; but a preferred embodiment of the invention is shown in the accompanying drawings, in which:

Figure 4 is a fragmentary perspective view showing the mechanical details of the machine.

Figure 5 is a sectional view taken substantially along the line 5—5 of Figure 1.

Figure 6 is a fragmentary plan view showing the means whereby the filler material is transferred from one conveyor to the other.

Figure 7 is a perspective view of the filler ejecting mechanism.

Figure 8 is a front view of one of the wafer dispensing containers.

Figure 9 is a sectional view taken along the line 9—9 of Figure 8.

Figure 10 is a sectional view taken along the line 10—10 of Figure 9.

Figure 11 is a sectional view taken along the line 11—11 of Figure 9.

Figure 12 is a perspective view of the wafer ejecting mechanism.

Figure 1:
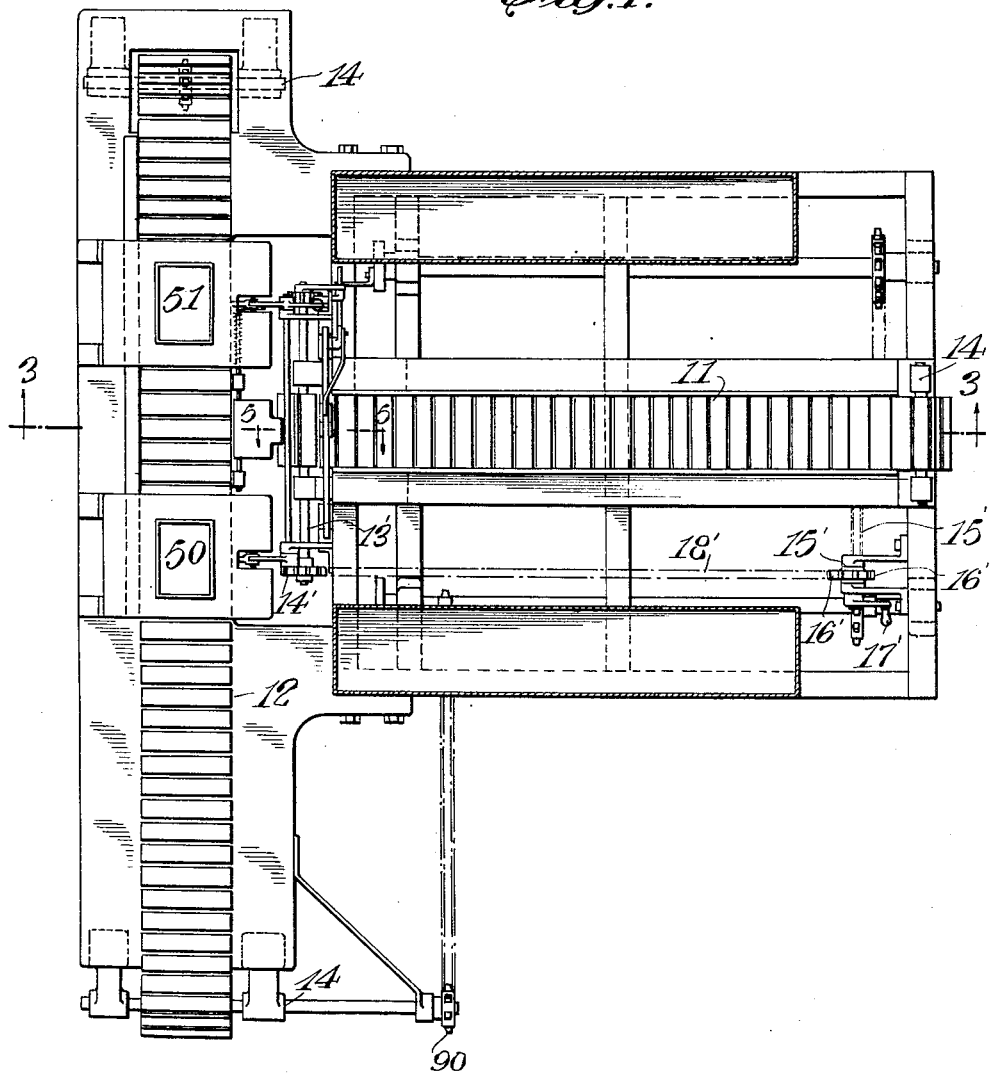
Figure 1 is a top plan view of an ice cream sandwich-making machine manufactured in accordance with my invention.

The invention will first be more particularly described, with reference to the accompanying drawings, which are to be taken as a part of this specification, and then pointed out in the claims at the end of the description.

Similar characters of reference are employed in the above described views to indicate corresponding parts throughout and the device involves in its general organization a frame or chassis 10 designated to accommodate a pair of endless conveyors 11 and 12. These conveyors are of the conventional type and are mounted on toothed drums 13 supported on the chassis in bearings 14 as clearly shown in Figure 1. The conveyor 11 is adapted to convey filler material or ice cream and the conveyor 12 is adapted to convey the finished article or sandwich from the machine. One of the drums 13 upon which the conveyor 11 is mounted is provided with a centre shaft 13′ having a sprocket 14′ on the end thereof. A shaft 15′ is journaled on the frame and has a sprocket 16′ secured thereto which sprocket is provided with a handle 17′. A chain 18′ extends between the sprockets 14′ and 16′ to enable the conveyor 11 to be operated by hand if so desired.

The nature of the present machine is sufficiently complicated that it is deemed pertinent to treat each department of the invention separately in this specification and accordingly, there are four separately useful, but interrelated, departments of the invention, and these include first, the filler cutting mechanism; second, the filler transfer mechanism for inverting and transferring the sliced filler to the wafer conveyor; third, a pair of wafer dispensing containers and last, a single operating mechanism for causing the respective departments to function in the proper manner.

Figure 2:
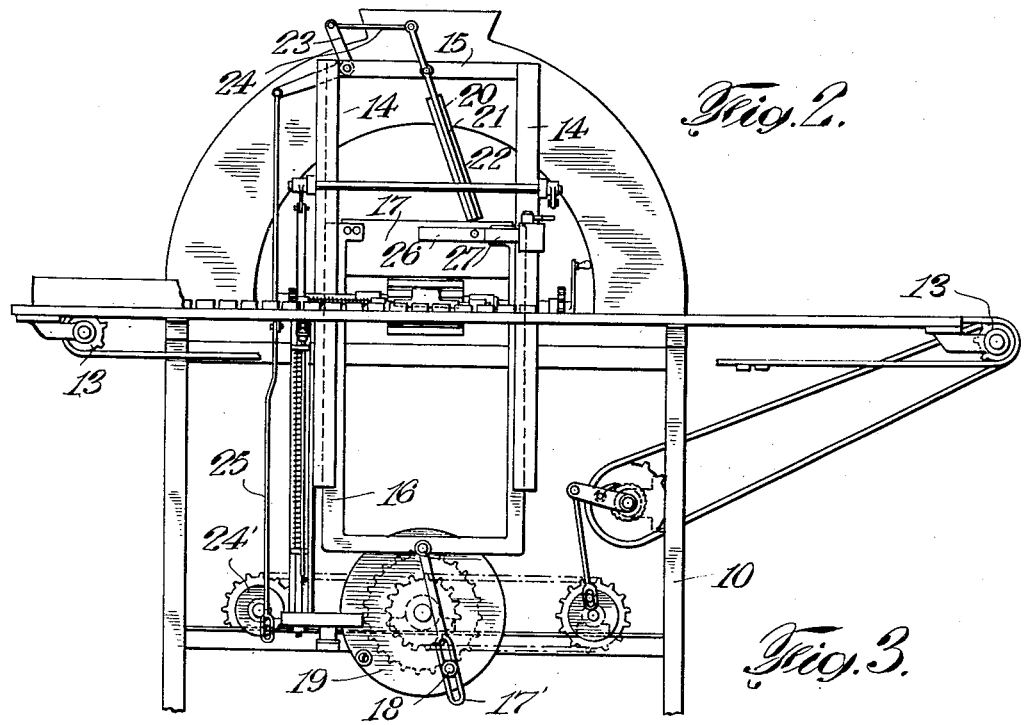
Figure 2 is a front elevation of the ice cream sandwich-making machine.

The first feature of the invention that will be described is the filler cutting mechanism. Referring now to Figure 2, it will be seen that mounted on the carrier are a pair of vertical standards 14 having a bridge 15 thereacross at their upper ends. These standards 14 are U-shape in cross section and have slidably mounted therebetween a U-shape knife carrier 16 across the ends of which is removably mounted a horizontal knife 17. The base of the knife carrier 16 has a slotted link 17′ pivoted thereto and a pin 18 mounted on a disc 19 is adapted to move the link 17′ to impart reciprocating motion to the knife blade 17. The bridge 15 has a bifurcated wiper pivoted thereto and this wiper is comprised of a pair of spaced parallel prongs having a felt or other lining 22 secured thereto. The bridge 15 has a bell-crank lever 23 pivoted thereto, one end of which is connected by a link 24 to the wiper and the other end of which is connected by a link 25 to an eccentric point on a disc 24′, there being a pin and slot connection between this disc 24′ and the link 25. Thus, it will be seen that as the filler material is periodically moved under the knife blade, it is sliced by the knife 17.

After the material has been sliced by the knife, it is transferred from one conveyor to the other. In order that the filler material will not adhere to the knife when the same is cut, there is provided an ejector mechanism shown in Figure 7. This ejecting mechanism comprises a thin blade 26 having an offset portion 27. This blade is clamped to the knife blade 17 by means of rod 28 having an abutment 29 on one end thereof. The rod 28 extends through the ejector and through the knife blade 17, and a spring 42 surrounds the rod 28 and bears against an abutment 43 on the other end of the rod. The abutment 29 bears against the ejector and the same is normally retained against the knife blade 17. A resilient cam 44 is mounted on the standard 14 and is adapted to engage the member 27 when the knife 17 is in its elevated position. Thus, the ejector mechanism is periodically thrown outwardly from the knife blade and any material tending to adhere to the knife is thrown on the transfer plate 33.

Figure 3:
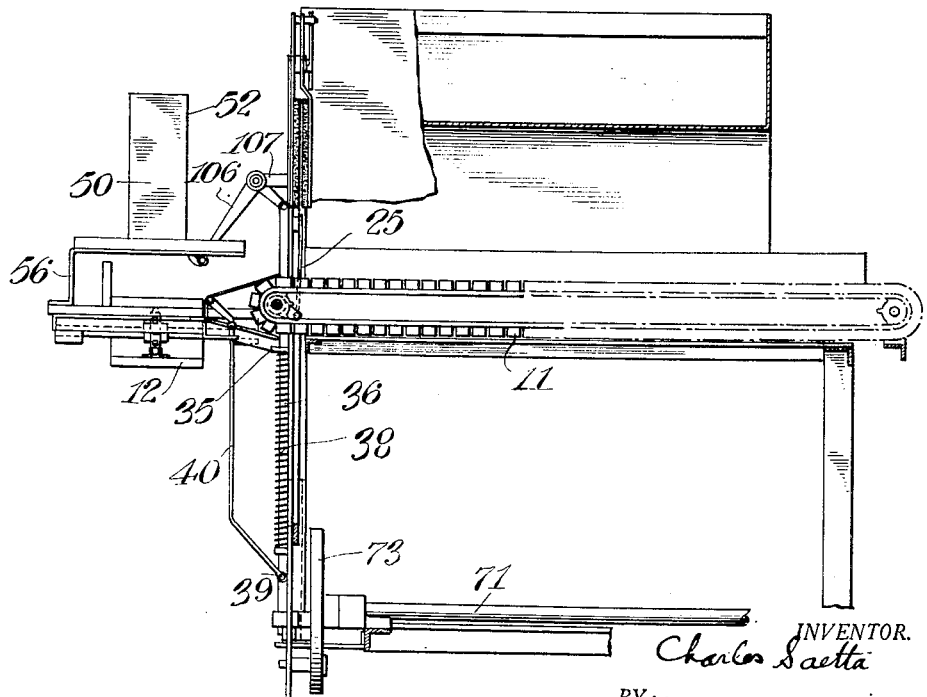
Figure 3 is a fragmentary side view showing the means whereby the filler material is cut and transferred from one endless conveyor to the other.

Reference to Figures 1, 3, and 4 will reveal the manner and means by which the sliced material is transferred from one conveyor to the other, particular reference being had to Figure 4. It will be seen that a rod 30 is rotatably mounted in brackets 31 which are secured to convenient points on the frame. This rod is spring-pressed as at 32 and has mounted thereon a transferring member 33 adapted to bear against the conveyor 11 and adapted to receive the cut portion of the filler material. A cam arm 34 is secured to one end of the rod 30.

Slidably mounted in a bracket 35 on the arm is a plunger 36 having a collar 37 thereon and having a coil spring 38 surrounding the same and bearing against the collar 37 and bracket 35. The lower portion of this particular plunger has a pin 39 thereon to which is pivoted an arm 40 extending upwardly through the bracket 35. The upper end of the arm 40 has a roller 41 mounted thereon which roller is adapted to bear against the arm 34 to impart motion to the same to rotate the rod 30 and transfer member 33. The plunger 36 has a lug 45 on the lower end thereof and this lug has a slot 46 formed therein adapted to receive one side of a channel member 47 secured to the frame so that the lug is slidable, up and down. The lug 45 is adapted to be engaged by a pin 49 on an eccentric member 48 which will be described later. Thus, it will be seen that as the eccentric member 48 rotates, the transfer member 33 is periodically turned on its axes to transfer the filler material from one conveyor to the other and reverse the same. The spring 32 serves to restore the transfer member to its normal position.

A description of the wafer ejecting containers will now ensue. Referring to Figures 1, 3, and 8 to 12, a wafer container is shown at 50 and another similar container at 51. These containers are identical in construction and a description of one of these containers is believed to be adequate. Each container comprises a casing 52 adapted to receive a plurality of wafers or other sandwich cover material. The lower edge of opposite sides of the casing are provided with external flanges 53 and secured to these flanges are a pair of channel members 55. These channel members are supported by Z-shape brackets 56 secured to a stationary portion of the frame.

Thus, the entire wafer dispensing assemblies are supported in spaced elevated position with respect to the conveyor 12. The actual ejecting mechanism comprises a U-shape member 60 having parallel arms 61 and 62, slidably mounted within the channel members 55. The members 61 and 62 have opposed ledges 54 and 57 on their inner sides and a pair of opposed ledges 58 and 59 face each other at the extremities of the arms 61 and 62 respectively. The ledges 58 and 59 are elevated with respect to the ledges 54 and 57 and a slight gap intervenes between the two sets of ledges. The member 60 has a link 105 secured thereto which link is secured to one end of a bell-crank lever 106 pivoted to a bracket 107 on the frame. The other end of the bell-crank lever is pivoted to the plunger 36 and thus (referring to Fig. 4) when the plunger 36 is periodically elevated, the member 60 reciprocates and the stacked wafers resting on the ledges 54 and 57 are dispensed. Referring to Figure 12, an abutment 109 is shown. This abutment is secured to one lower edge of the wafer container and as the member 60 is drawn upwardly of the container, this abutment holds the lower wafer in the stack stationary, while the ledges 54 and 57 are withdrawn from under the wafer. The ledges 58 and 59 serve to catch the next wafer when the member 60 is in its rearmost position and when the member 60 is again in its foremost position, the lowermost wafer in the stack is transferred to the ledges 54 and 57 and this operation is repeated.

The means whereby the conveyors are given periodic motion will become apparent as the following detailed description of the mechanical operating means ensues referring particularly to Figure 4. A pair of shafts 70 and 71 are pivotally mounted in the frame and extend transversely thereof. These shafts have sprockets 52 and 53 secured to one end thereof and a chain serves to connect the two sprockets so that one shaft becomes a driving shaft and the other a driven shaft. It is immaterial which shafts receives direct power as both shafts operate concurrently; however, for the purpose of description, it will be assumed that the shaft 71 is connected to a motor, (not shown). The shaft 71 has a large gear 72 secured thereto midway between its extremities and the end of the shaft 71 has a disc 73 thereon. It is on this disc that the pin 49, which operates the filler transferring member 33, is mounted, and it is also on this disc that the pin 18, which operates the filler cutting mechanism, is mounted.

Still referring to Figure 4, a shaft 80 is shown. This shaft is suitably mounted for rotation in the frame. This shaft has a ratchet wheel 81 secured to one end thereof and a link 82 is pivoted to the end of the same end of the shaft 80. The shaft 80 extends through the drum 13 upon which the conveyor 11 is mounted. The link 82 has a pawl 84 pivoted thereto and this pawl is spring-pressed against the ratchet 81. The shaft 70 has a disc 86 mounted on one end thereof and a pin 85 is eccentrically mounted on the disc. A rod is shown at 25. This rod has a slot 88 in one end thereof through which the pin 85 extends. The rod 25 has a flattened portion 88 to which is pivoted the link 82. The rod 25 has been mentioned before in the specification in connection with the knife blade wiper 20 as this rod performs the double function of operating the knife blade wiper and the drum upon which the conveyor 11 is mounted. It will be seen that as the disc 86 rotates, the rod will be given vertical reciprocating motion and the conveyor will operate periodically advancing a predetermined distance and stopping while the ratchet 84 returns for its stroke.

One of the end shafts 14 shown in Figure 1 extends through one of the drums 13 on which the conveyor 12 is mounted. This end shaft 14 has a gear 90 on one end thereof. The gear 90 is connected to a second gear 91 by a chain 92. The gear 91 has a ratchet wheel secured thereto. The gear 91 is rotatably mounted on a shaft 93 secured in suitable bearings on the frame. The shaft 93 has a link 94 pivoted thereto on which link is pivoted a pawl 95. One end of the link 94 has a rod 96 pivoted thereto and this rod is pivoted to a disc 97 by a pin and slot connection 98. The disc 97 is mounted on a shaft 98 which shaft has a spring 99 thereon adapted to be driven by a chain 100 from a gear 101 on the shaft 71. Thus it will be seen that as the shaft 71 rotates, motion is imparted to the shaft 98 and through the train of elements leading up to the ratchet and pawl connection of the gear 91 and thus the conveyor 10 will be periodically moved.

The above description is believed to adequately define the nature of the invention as regards its construction and its mechanical details and a detailed description of the operation of the device will now follow:

In actual operation, the filler material or ice cream is placed on the conveyor 11 so that the same may be fed towards the cutter and the wafers are arranged in superimposed relationship within the wafer containers 50 and 51. The driving shaft 71 is set into operation together with the disc 73 as the pinion 49 engages the lug 45, the rod 36 has reciprocated vertically and wafers are simultaneously dropped on the sandwich carrying conveyor in a manner that has previously been described. As the wafers are being dropped, the pawl 84 that operates the carrier 11 and the pawl 95 that operates the carrier 12 are both being retracted. As soon as the wafers have been dropped on opposite sides of the transfer member 33, the pawl 84 and the pawl 95 become operative to rotate both conveyors a predetermined distance. The exact distance the conveyors transfer during this periodic movement is determined by the action of the pawls and should be, for the container 12, exactly half the distance from the central point of each container to the midpoint of the line joining the centres of both containers. Thus, when the pawl action ceases, a wafer that has been dropped from the container 51 will lie directly in front of the transfer member. The distance of periodic travel of the conveyor 11 determines the desired width of each slice of filler material. This width may be adjusted by an adjusting pin and slot connection 85 between the rod 25 and the pawl assembly 84 but normally the distance travelled by the conveyor 11 should be slightly less than the width of a wafer.

Assuming then, that the machine has operated this far successfully, the knife blade having cut a slice of the filler material and placed the same on the transfer member, this latter member is set into operation by means of the cam roller 31 and the cam arm 34. The filler material on the transfer member is turned or flipped on to the wafer directly in front of the same. After this has taken place, the pawl 84 again becomes operative to move the conveyor 12. The wafer with the filler material resting on top thereof is moved beneath the second container and when both wafer containers simultaneously drop a wafer, a second wafer falls on top of the filler material, thus completing a sandwich. The other container merely drops a wafer to be carried to the transfer member as described before.

One decided advantage of the invention resides in the fact that all of the parts are synchronized with the exception of the transfer member 33 and the knife blade wiper. Both conveyors move simultaneously and stop together and all the other elements are operative when these parts are moving with the exception of the members just mentioned.

Throughout this specification and in the claims, the term wafer has been used to designate the material between which the filler material is contained. It is to be distinctly understood that this term is used in its broadest aspect for I contemplate manufacturing all manner of sandwiches in accordance with the spirit of the present invention. While I prefer to have the filler material of ice cream and the cover for the sandwich formed of a wafer-like pastry, such a composition is not essential, for, obviously the composition of the sandwich may be varied and irrespective of these details in manufacturing these sandwiches, the essential features of this invention are always preserved.

It is also obvious that some changes may be made in the general arrangements and combinations of the several devices and parts, as well as in the details of the construction thereof without departing from the scope of the present invention as set forth in the foregoing specification, and as defined in the following claims. Hence, I do not limit my invention to the exact arrangements and combinations of the said device and parts as described in the said specification, nor do I confine myself to the exact details of the construction of the said parts as illustrated in the accompanying drawings. Only in so far as I have particularly pointed out my invention in the appended claims, do I desire to be limited.

I claim:

1. A sandwich-making machine comprising a belt conveyor adapted to transport the filler material, a second belt conveyor at right angles to and adjacent the end of said first conveyor and adapted to transport slices of cover material, holders for the cover material above said second conveyor and equally spaced from said first conveyor and adapted to deposit single slices of said material on said second conveyor, means for transferring filler material from said first conveyor to said second conveyor comprising a hinged plate arranged to receive the filler material from said first conveyor and invert it on the other conveyor, and means for turning said plate on its hinge, means at the end of said first conveyor to cut the filler material and transfer it to said plate, means for moving the second conveyor periodically a distance such that the cover material deposited from one holder is moved to a position opposite the end of said first conveyor and in position to receive the filler material and means for simultaneously operating the cover material holders and the filler transfer means when the conveyors are at rest.

2. A sandwich-making machine comprising a belt conveyor adapted to transport the filler material, a second belt conveyor at right angles to and adjacent the end of said first conveyor and adapted to transport slices of cover material, holders for the cover material above said second conveyor and equally spaced from said first conveyor and adapted to deposit single slices of said material on said second conveyor, means for transferring filler material from said first conveyor to said second conveyor comprising a hinged plate arranged to receive the filler material from said first conveyor and invert it on the other conveyor, and means for turning said plate on its hinge, means for moving the second conveyor periodically a distance such that the cover material deposited from one holder is moved to a position opposite the end of said first conveyor and in position to receive the filler material, and means for simultaneously operating the cover material holders and the filler transfer means when the conveyors are at rest.

3. A sandwich-making machine comprising a belt conveyor adapted to transport the filler material, a second belt conveyor at right angles to and adjacent the end of said first conveyor and adapted to transport slices of cover material, holders for the cover material above said second conveyor and equally spaced from said first conveyor and adapted to deposit single slices of said material on said second conveyor, means for transferring filler material from said first conveyor to said second conveyor, means for moving the second conveyor periodically a distance such that the cover material deposited from one holder is moved to a position opposite the end of said first conveyor and in position to receive the filler material and means for simultaneously operating the cover material holders and the filler transfer means when the conveyors are at rest.

In testimony whereof, I have signed my name to this specification this 28th day of May, 1928.

CHARLES SAETTA.